United States Patent
Dinh et al.

(10) Patent No.: US 11,397,952 B2
(45) Date of Patent: Jul. 26, 2022

(54) SEMI-SUPERVISED, DEEP-LEARNING APPROACH FOR REMOVING IRRELEVANT SENTENCES FROM TEXT IN A CUSTOMER-SUPPORT SYSTEM

(71) Applicant: Zendesk, Inc., San Francisco, CA (US)

(72) Inventors: Anh Thien Dinh, Pascoe Vale (AU); Wei Chu, Southbank (AU); Paul E. Gradie, Victoria (AU)

(73) Assignee: Zendesk, Inc., San Francisco, CA (US)

( * ) Notice: Subject to any disclaimer, the term of this patent is extended or adjusted under 35 U.S.C. 154(b) by 510 days.

(21) Appl. No.: 16/369,545

(22) Filed: Mar. 29, 2019

(65) Prior Publication Data

US 2019/0236613 A1 Aug. 1, 2019

Related U.S. Application Data (63) Continuation-in-part of application No. 15/607,318, filed on May 26, 2017, now Pat. No. 10,580,012, (Continued)

(51) Int. Cl.
*G06N 3/00* (2006.01)
*G06F 16/33* (2019.01)
(Continued)

(52) U.S. Cl.
CPC ....... *G06Q 30/016* (2013.01); *G06F 16/3347* (2019.01); *G06F 17/18* (2013.01); *G06F 40/00* (2020.01); *G06F 40/216* (2020.01); *G06F 40/289* (2020.01); *G06F 40/30* (2020.01); *G06K 9/6267* (2013.01); *G06N 3/006* (2013.01);
(Continued)

(58) Field of Classification Search
None
See application file for complete search history.

(56) References Cited

U.S. PATENT DOCUMENTS

| | | | |
|---|---|---|---|
| 2016/0162474 A1* | 6/2016 | Agarwal | G06F 40/35 704/9 |
| 2016/0259789 A1* | 9/2016 | Shrinath | G06F 16/24578 |

(Continued)

*Primary Examiner* — Maria C Santos-Diaz
(74) *Attorney, Agent, or Firm* — Park, Vaughan, Fleming & Dowler LLP (57) ABSTRACT

During operation, the system receives a customer request. Next, the system segments the customer request into customer request sentences. The system then encodes each sentence from the customer request with information sequentially collected from the previously observed sentences. Next, the system translates the encodings to sparse probabilities that measure the importance of sentences from the customer request. The system then extracts relevant sentences from the customer request based on the importance. Next, the system forms an extracted-sentence customer request embedding from embeddings for the extracted relevant customer request sentences. The system then uses the extracted-sentence customer request embedding to select an agent response from a set of possible agent responses based on comparisons between the extracted-sentence customer request embedding and embeddings for the set of possible agent responses. Finally, the system presents the selected agent response to the customer to facilitate resolving the customer request.

19 Claims, 7 Drawing Sheets

Related U.S. Application Data which is a continuation-in-part of application No. 15/087,755, filed on Mar. 31, 2016, now abandoned.

(51) Int. Cl.
| | |
|---|---|
| *G06Q 30/00* | (2012.01) |
| *G06N 3/04* | (2006.01) |
| *G06N 3/08* | (2006.01) |
| *G06F 17/18* | (2006.01) |
| *G06K 9/62* | (2022.01) |
| *G06Q 30/02* | (2012.01) |
| *G06F 40/00* | (2020.01) |
| *G06F 40/30* | (2020.01) |
| *G06F 40/216* | (2020.01) |
| *G06F 40/289* | (2020.01) |
| *G06Q 10/02* | (2012.01) |

(52) U.S. Cl.
CPC ......... *G06N 3/0445* (2013.01); *G06N 3/0454* (2013.01); *G06N 3/08* (2013.01); *G06Q 30/0282* (2013.01); *G06Q 10/02* (2013.01)

(56) References Cited

U.S. PATENT DOCUMENTS

| | | | |
|---|---|---|---|
| 2017/0060366 A1* | 3/2017 | Alexander | G06Q 30/016 |
| 2018/0121799 A1* | 5/2018 | Hashimoto | G06F 40/284 |
| 2018/0351215 A1* | 12/2018 | Austin | B60L 53/14 |
| 2019/0222540 A1* | 7/2019 | Relangi | G06Q 30/01 |
| 2020/0293874 A1* | 9/2020 | Ji | G06N 5/04 |

\* cited by examiner

Inputs
    Raw ticket texts
    Raw article texts
Preprocess
    Spacy(ticket_text, article_text)
    => ticket_segmented_sentence, article_segmentated_sentences
    => ticket_sentences_embedding, article_sentences_embedding The model
    => attn_on_article(ticket_sents_embed, article_sents_embed)
        => attn_article_embed
    => RNN/SeqModel(ticket_sents_embed, attn_article_embed)
        => sentence_selection_probs: [b, ticket_num_sents]
    => ticket_sents_embed * sentence_selection_probs
        => extracted_ticket_sents_embed
    => CNN(extracted_ticket_sents_embed) & CNN(article_sents_embed)
        => extracted_ticket_doc_embed & article_doc_embed
    => cosine_similarity( extracted_ticket_doc_embed, article_doc_embed)
    => contrastive loss

SEMI-SUPERVISED, DEEP-LEARNING APPROACH FOR REMOVING IRRELEVANT SENTENCES FROM TEXT IN A CUSTOMER-SUPPORT SYSTEM

RELATED APPLICATIONS

This application is a continuation-in-part of, and hereby claims priority under 35 U.S.C. § 120 to, pending U.S. patent application Ser. No. 15/607,318, entitled "Article-Suggestion System for Automatically Resolving Customer-Service Requests," by inventors Christopher J. Hausler, et al., filed on 26 May 2017. U.S. patent application Ser. No. 15/607,318 is itself a continuation-in-part of, and claims priority under 35 U.S.C. § 120 to, U.S. patent application Ser. No. 15/087,755, entitled "Answer-Suggestion System for Automatically Resolving Customer Requests," by inventor Thomas Pelletier, filed on 31 Mar. 2016.

BACKGROUND

Field

The disclosed embodiments generally relate to computer-based customer-support systems. More specifically, the disclosed embodiments relate to a semi-supervised, deep-learning approach for removing irrelevant sentences from text in a customer-support system.

Related Art

An increasing number of computer-based systems are presently using machine learning (ML) techniques to process textual information. These systems support a variety of applications, including: language translation; question answering; text summarization; and sentiment analysis. One of the main challenges for operating these systems in a production environment is to deal with noisy textual data. For example, an email-classification system needs to effectively handle salutations, machine-generated text, and senders' signatures in order to optimize performance. Moreover, inadequate preprocessing of noisy textual data can negatively impact system performance because irrelevant textual information can be misidentified as being important textual information.

For this reason, preprocessing operations to remove irrelevant text are commonly performed in computer systems that handle textual information. These preprocessing operations are typically defined by a set of manually specified regular-expression (regex) rules. The main benefit of using such regex rules is that they are deterministic and easy to implement. However, the process of manually specifying regex rules is very time-consuming. Moreover, the complexity of these rules grows quickly as the system receives data from a wider variety of sources, and rules are limited by what can be explicitly defined. In addition, each new language that a system accommodates requires different preprocessing rules.

It is possible to use model-based machine-learning techniques to preprocess textual data. However, existing model-based machine-learning techniques for preprocessing textual data use labeled data to train a classifier, which is used to differentiate between important textual information and irrelevant textual information. However, such labeled training data is difficult and time-consuming to obtain. Moreover, supervised models require a substantial amount of training data to achieve reasonable performance.

Hence, what is needed is a technique for preprocessing textual data to remove irrelevant information without the above-described drawbacks of existing preprocessing techniques.

SUMMARY

The disclosed embodiments relate to a system that automatically resolves a customer request. During operation, the system receives a customer request. Next, the system segments the customer request into customer request sentences. The system then encodes each sentence from the customer request with information sequentially collected from the previously observed sentences. Next, the system translates the encodings to probabilities that measure the importance of sentences from the customer request. The system then extracts relevant sentences from the customer request based on the importance. Next, the system forms an extracted-sentence customer request embedding from embeddings for the extracted relevant customer request sentences. The system then uses the extracted-sentence customer request embedding to select an agent response from a set of possible agent responses based on comparisons between the extracted-sentence customer request embedding and embeddings for the set of possible agent responses. Finally, the system presents the selected agent response to the customer to facilitate resolving the customer request.

In some embodiments, the system uses combination of a recurrent neural network (RNN), a feed-forward network, and Sparsemax while determining the sentence-selection probabilities for the customer request sentences.

In some embodiments, the system uses a convolutional neural network (CNN) while forming the embedding for the entire customer request from the customer request sentence embeddings.

In some embodiments, the system forms an embedding for a new agent response by performing the following operations. First, the system receives the new agent response, which is responsive to a customer request. Next, the system segments the new agent response into new agent response sentences. The system then embeds the new agent response sentences to produce corresponding new agent response sentence embeddings. Finally, the system forms the embedding for the new agent response from the new agent response sentence embeddings.

In some embodiments, the system trains a model, which is used to select agent responses, based on a training data set comprising a set of customer requests and a set of associated agent responses.

In some embodiments, the system additionally receives feedback indicating whether or not the selected agent response was helpful in resolving the customer request. In response to the feedback, the system uses a contrastive loss, which includes components from both positive and negative predictions, to guide a training process for a model that is used to select relevant sentences from a customer request.

In some embodiments, the agent response comprises: a responsive textual communication drafted by an agent; or a responsive article.

In some embodiments, the customer request includes a question from the customer about the product or the service used by the customer.

In some embodiments, the customer request comprises a ticket associated with a customer issue in a help center ticketing system.

The disclosed embodiments also relate to a system that classifies a customer request. During operation, the system receiving a customer request. Next, the system segments the customer request into customer request sentences. Then, the system encodes each sentence from the customer request with information sequentially collected from the previously observed sentences. Next, the system translates the encodings to probabilities that measure the importance of sentences from the customer request. Then, the system extracts relevant sentences from the customer request based on the importance. Finally, the system uses the extracted relevant sentences to classify the customer request into a customer-support topic.

In some embodiments, the system additionally presents a user interface to a customer-support agent, wherein the user interface organizes customer requests based on customer-support topics, and wherein the user interface enables the customer-support agent to perform a customer-support operation in response to a customer request.

In some embodiments, the customer-support operation includes one or more of the following: suggesting an agent's answer or a helpful article to the customer; creating, editing or deleting help center answers or articles; and configuring a chatbot to facilitate resolving the customer request.

The disclosed embodiments also relate to a system that summarizes a customer request. During operation, the system receives a customer request. Next, the system segments the customer request into customer request sentences. The system then encodes each sentence from the customer request with information sequentially collected from the previously observed sentences. Next, the system translates the encodings to probabilities that measure the importance of sentences from the customer request. Then, the system extracts relevant sentences from the customer request based on the importance. Finally, the system uses the extracted relevant sentences to summarize the customer request.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

In our model-based approach to selecting agent responses, we use training data comprising un-prepossessed conversational data, which includes questions from customers and associated answers from customer-support agents. Although this training dataset is noisy and unlabeled, it has volume and implicitly contains valuable information, including the fact that a ticket and its corresponding agent response are related to the same topic.

In order to automatically select an agent response, we construct a neural network, which learns how to correlate questions and associated answers (QA) from the training data. During this training process, we use a text-preprocessing model to remove unimportant sentences from customer questions. Note that if we are able to extract most of the important sentences from the ticket, superfluous sentences are eliminated, and the model will do a much better job of selecting the correct agent response for the ticket. (This text-preprocessing model can also be used to cleanse textual data in other contexts, such as in applications like classifying a customer request or summarizing a customer request.)

In preliminary experiments, the proposed text-preprocessing model was able to separate important sentences from unimportant sentences. For example, when the model was tested on a real dataset, it was able to remove salutations, signatures, duplicated content and machine-generated text from customer tickets. This text-preprocessing model is described in further detail below. However, we first we describe a computing environment in which the preprocessing system operates.

Computing Environment

Figure 1:
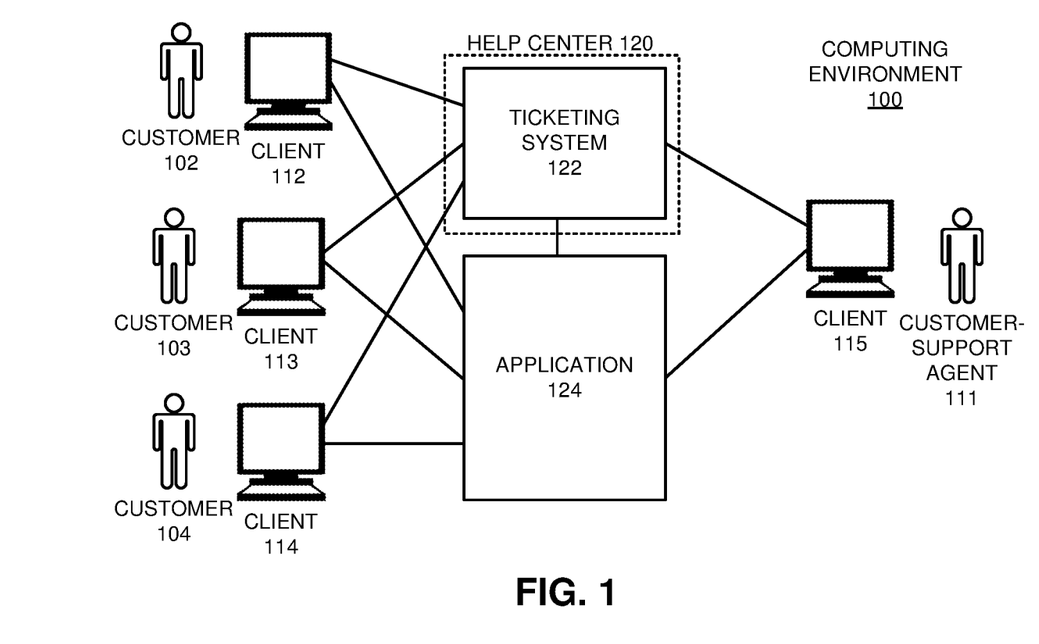
FIG. 1 illustrates a computing environment including an application and associated ticketing system in accordance with the disclosed embodiments.

FIG. 1 illustrates a computing environment 100 including an application 124 and a ticketing system 122 in accordance with the disclosed embodiments. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems or questions about application 124, they can access a help center 120 to obtain help dealing with issues, which can include various problems and questions. For example, a user of accounting software may need help using a feature of the accounting software, or a customer of a website that sells sporting equipment may need help cancelling an order that was erroneously entered. This help may be provided by a customer-support agent 111 who operates a client computer system 115 and interacts with customers 102-104 through help center 120. This help may also comprise automatically suggested helpful answers or articles that the customer can read to hopefully resolve the problem or question. (Note that the term "answer" as used in this specification can refer to either: a responsive textual communication drafted by an agent; or a responsive article.) Customer-support agent 111 can access application 124 (either directly or indirectly through help center 120) to help resolve an issue.

In some embodiments, help center 120 is not associated with computer-based application 124, but is instead associated with another type of product or service that is offered to a customer. For example, help center 120 can provide assistance with a product, such as a television, or with a service such as a package-delivery service.

Help center 120 organizes customer issues using a ticketing system 122, which generates tickets to represent each customer issue. Ticketing systems are typically associated with a physical or virtual "help center" (or "help desk") for resolving customer problems. Although the present invention is described with reference to a ticketing system, it is not meant to be limited to customer-service interactions involving ticketing systems. In general, the invention can be applied to any type of system that enables a customer to resolve a problem with a product or service provided by an organization.

Ticketing system 122 comprises a set of software resources that enable a customer to resolve an issue. In the illustrated embodiment, specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-service agent.

Ticketing System

Figure 2:
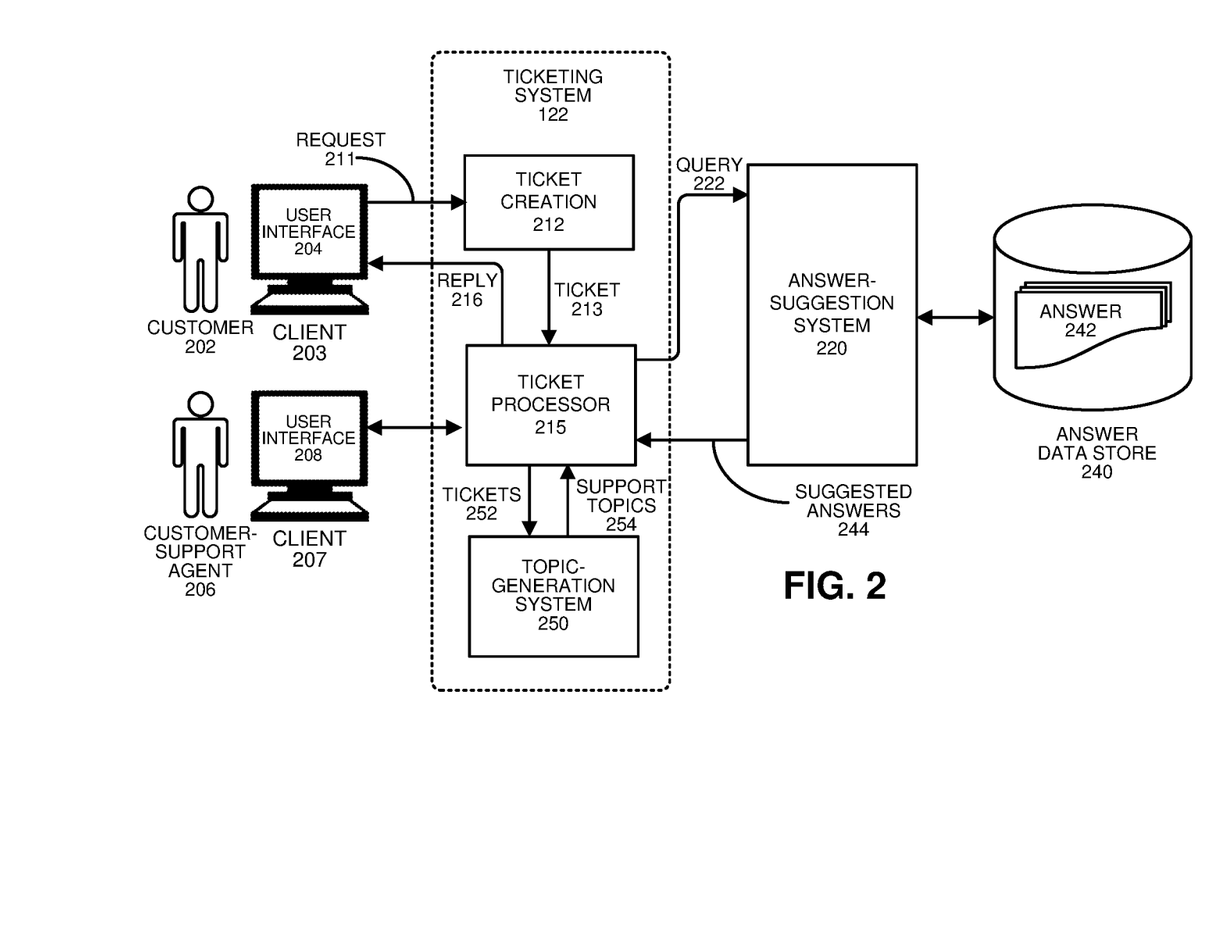
FIG. 2 illustrates system components involved in the answer-suggestion process in accordance with the disclosed embodiments.

FIG. 2 illustrates a number of processes, which are associated with a ticketing system 122 and an associated answer-suggestion system 220, in accordance with the disclosed embodiments. One of the processes starts with a ticket-creation operation 212 that takes place within ticketing system 122. This ticket-creation operation is triggered by actions of a customer 202 operating on a client 203 who has an issue with a product or a service, and submits a request 211 to obtain help with the issue. Note that customer 202 can submit request 211 through a number of possible channels, including through email, online forms, social networking sites, etc. In response to request 211, the ticket-creation operation 212 produces a ticket 213 that feeds into a ticket processor 215.

Next, ticket processor 215 can send a query 222, which is associated with the customer request 211 and the corresponding ticket 213, to an answer-suggestion system 220. Then, answer-suggestion system 220 obtains a set of suggested answers 244 from a set of answers 242 contained in an answer data store 240. Next, answer-suggestion system 220 returns the suggested answers 244 to ticket processor 215, which sends a reply 216 containing the suggested answers 244 to a user interface 204 to be displayed to customer 202. Note that user interface 204 can be implemented in a number of different ways for both mobile and desktop platforms. For example, user interface 204 can be incorporated into: a web page, an email, or a UI screen provided by an application.

Ticket processor 215 also feeds tickets 252 into a topic-generation system 250, which generates and returns a list of support topics 254 to ticket processor 215. (For a description of this type of topic-generation system, see U.S. patent application Ser. No. 16/232,482, entitled "Automatically Clustering Customer-Support Requests to Form Customer-Support Topics," by inventors Soon-ee Cheah and Ai-Lien Tran-Cong, filed on 26 Dec. 2018, which is incorporated by reference herein.) Ticket processor 215 uses this list of support topics 254 to generate a user interface 208, which is displayed to a customer-support agent 206 through a client 207. Within user interface 208, the support topics 254 are used to organize and display customer requests. User interface 208 also enables customer-support agent 206 to perform a customer-support operation in response to the customer requests. For example, the customer-support operation can include: suggesting an agent's answer or a helpful article to a customer; creating, editing or deleting an answer or article; or configuring a chatbot to facilitate resolving the customer request.

Answer-Suggestion Process

Figure 3:
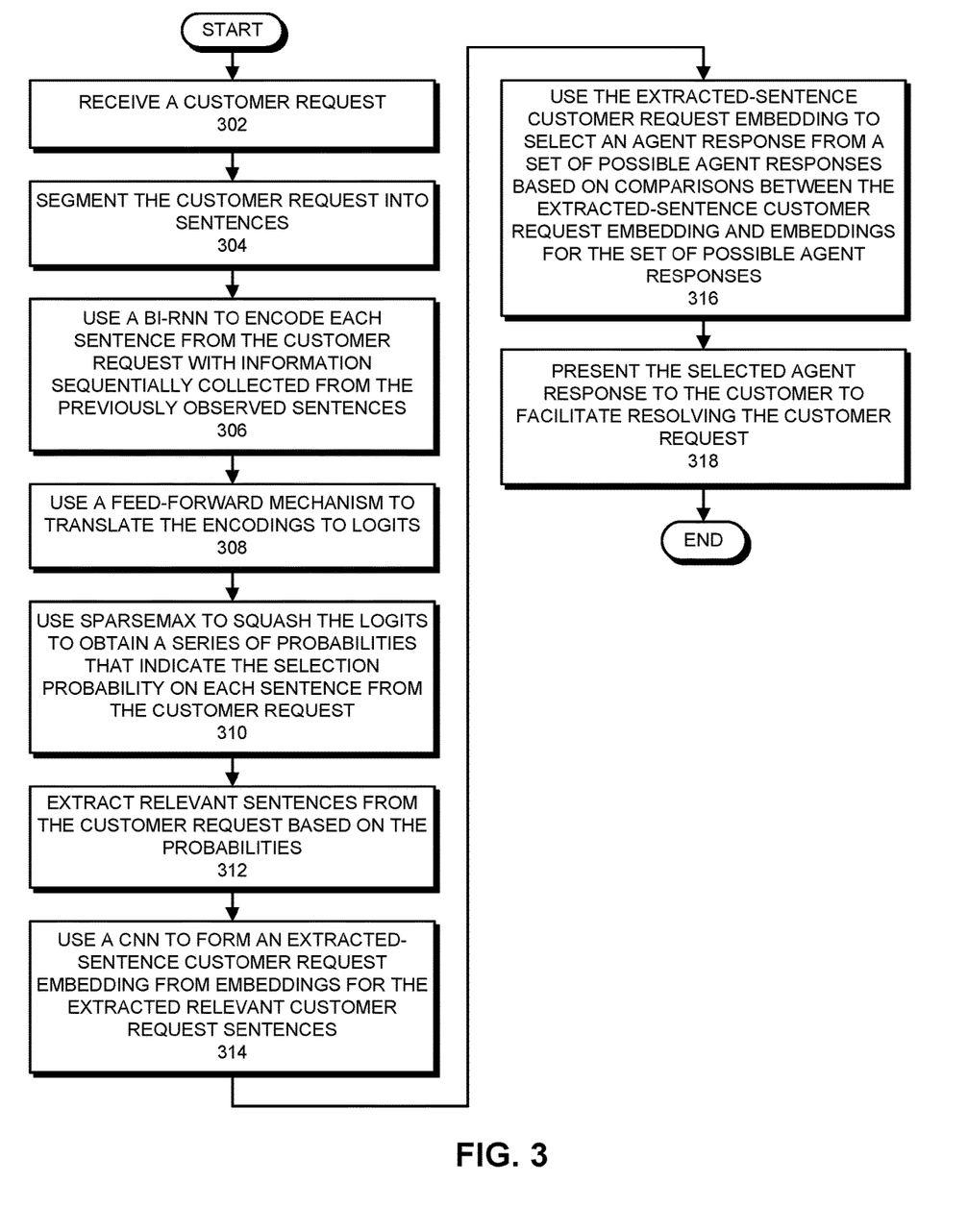
FIG. 3 presents a flow chart illustrating a process for suggesting a response to a customer request in accordance with the disclosed embodiments.

FIG. 3 presents a flow chart illustrating a process for suggesting a response to a customer request in accordance with the disclosed embodiments. During operation, the system receives a customer request (step 302). Next, the system segments the customer request into sentences (step 304). (For example, this segmentation can involve using the SpaCy™ sentence segmenter licensed by the Massachusetts Institute of Technology.) Next, the system uses a bidirectional recurrent neural network (Bi-RNN) to encode each sentence from the customer request with information sequentially collected from the previously observed sentences (step 306). Then, the system uses a feed-forward mechanism to translate the encodings to logits (step 308). Next, the system uses Sparsemax to squash the logits to obtain a series of probabilities that indicate the selection probability on each sentence from the customer request (step 310). (Note that Sparsemax allows multiple sentences to have selection probabilities close to zero. For more details about Sparsemax, please see "From Softmax to Sparsemax: A Sparse Model of Attention and Multi-Label Classification" by Andre Martins, Ramon Astudillo, *Proceedings of The 33rd International Conference on Machine Learning*, PMLR 48:1614-1623, 2016.) The system then extracts relevant sentences from the customer request based on the probabilities (step 312). (This extraction operation can involve using the selection probabilities to zero out sentences from the customer request.) Next, the system uses a CNN to form an extracted-sentence customer request embedding from embeddings for the extracted relevant customer request sentences (step 314).

Note that after the sentence-selection operation, the ticket embeddings will likely become sparse because some sentences are selected and other sentences are not selected, and the sentences that are not selected will be masked using zeros. However, these sparse embeddings will likely hinder the learning ability for a sequential model, such as an RNN. However, by using a CNN, we can avoid the zero-embedding problem, because the max pooling technique facilitates selecting the most significant items.

The system then uses the extracted-sentence customer request embedding to select an agent response from a set of possible agent responses based on comparisons between the extracted-sentence customer request embedding and embeddings for the set of possible agent responses (step 316). (For example, these comparisons can be based on a cosine distance.)

While training the model that is used to select relevant sentences from a customer request, we use contrastive loss to guide the training process. Contrastive loss is the sum of two sub-losses: one for positive predictions and one for negative predictions. While using contrastive loss, it is important to ensure that the average weights are set correctly for positive and negative predictions because not doing so will skew selection probabilities to one end, which will cause the model to either select all sentences or select no sentences. These predictions can be represented in matrix form, wherein the rows represent tickets and the columns represent agent responses. If an agent response helps to resolve a ticket, the corresponding matrix entry indicates a positive prediction. On the other hand, if the agent response does not help to resolve a ticket, the corresponding matrix entry indicates a negative prediction.

Figure 4:
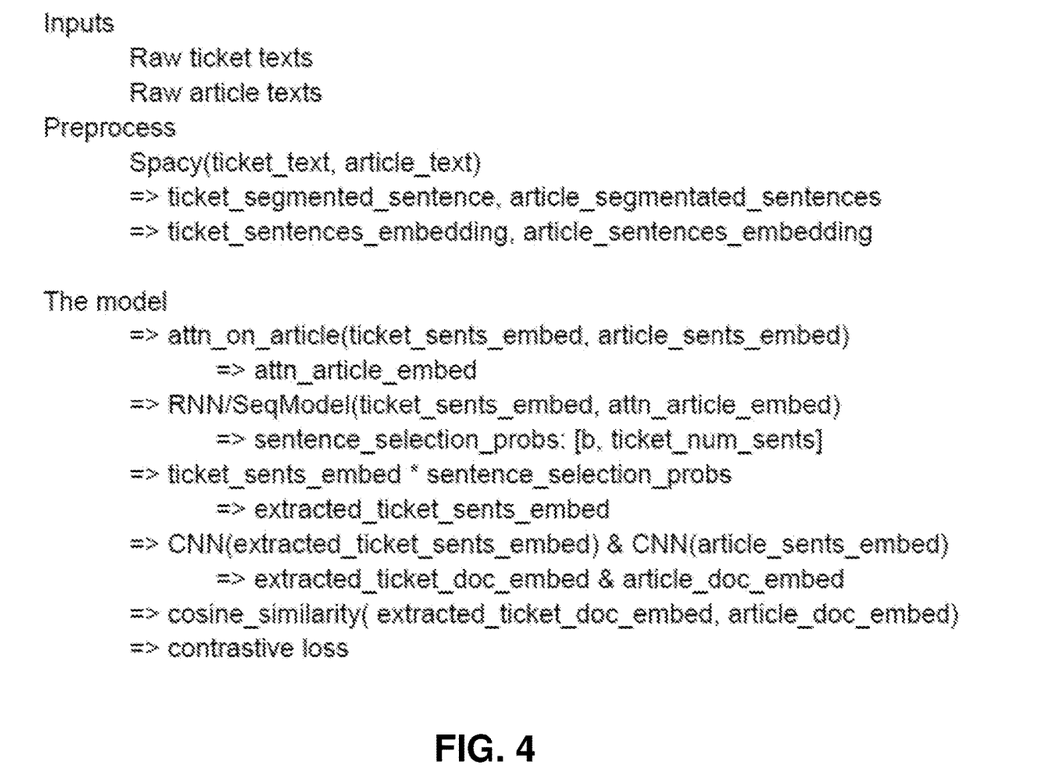
FIG. 4 presents corresponding pseudocode for the process for suggesting a response to a customer request in accordance with the disclosed embodiments.

Finally, the system presents the selected agent response to the customer to facilitate resolving the customer request (step 318). FIG. 4 presents corresponding pseudocode for the process of suggesting a response to a customer request in accordance with the disclosed embodiments.

Figure 5:
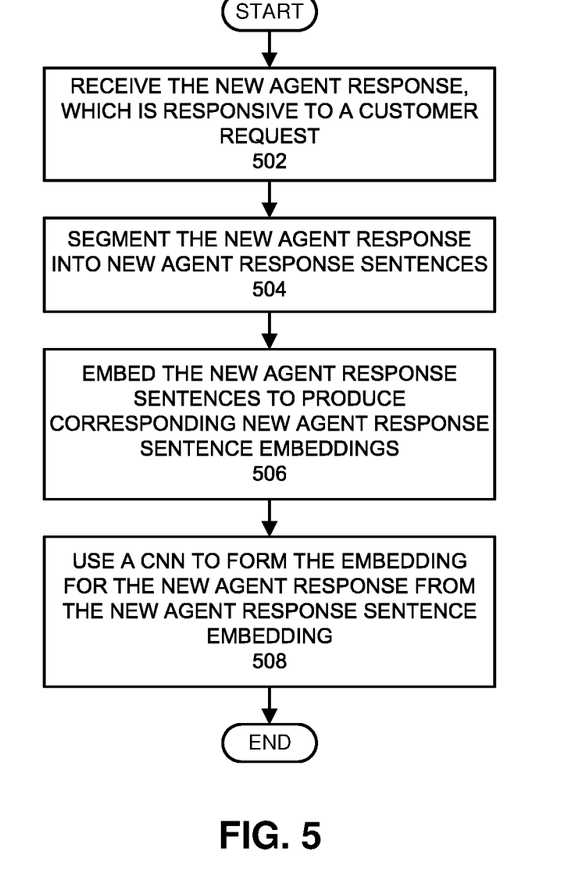
FIG. 5 presents a flow chart illustrating a process for forming an embedding for a new agent response in accordance with the disclosed embodiments.

FIG. 5 presents a flow chart illustrating a process for forming an embedding for a new agent response in accordance with the disclosed embodiments. First, the system receives the new agent response, which is responsive to a customer request (step 502). Next, the system segments the new agent response into new agent response sentences (step 504). The system then embeds the new agent response sentences to produce corresponding new agent response sentence embeddings (step 506). Finally, the system uses a CNN to form the embedding for the new agent response from the new agent response sentence embeddings (step 508).

Figure 6:
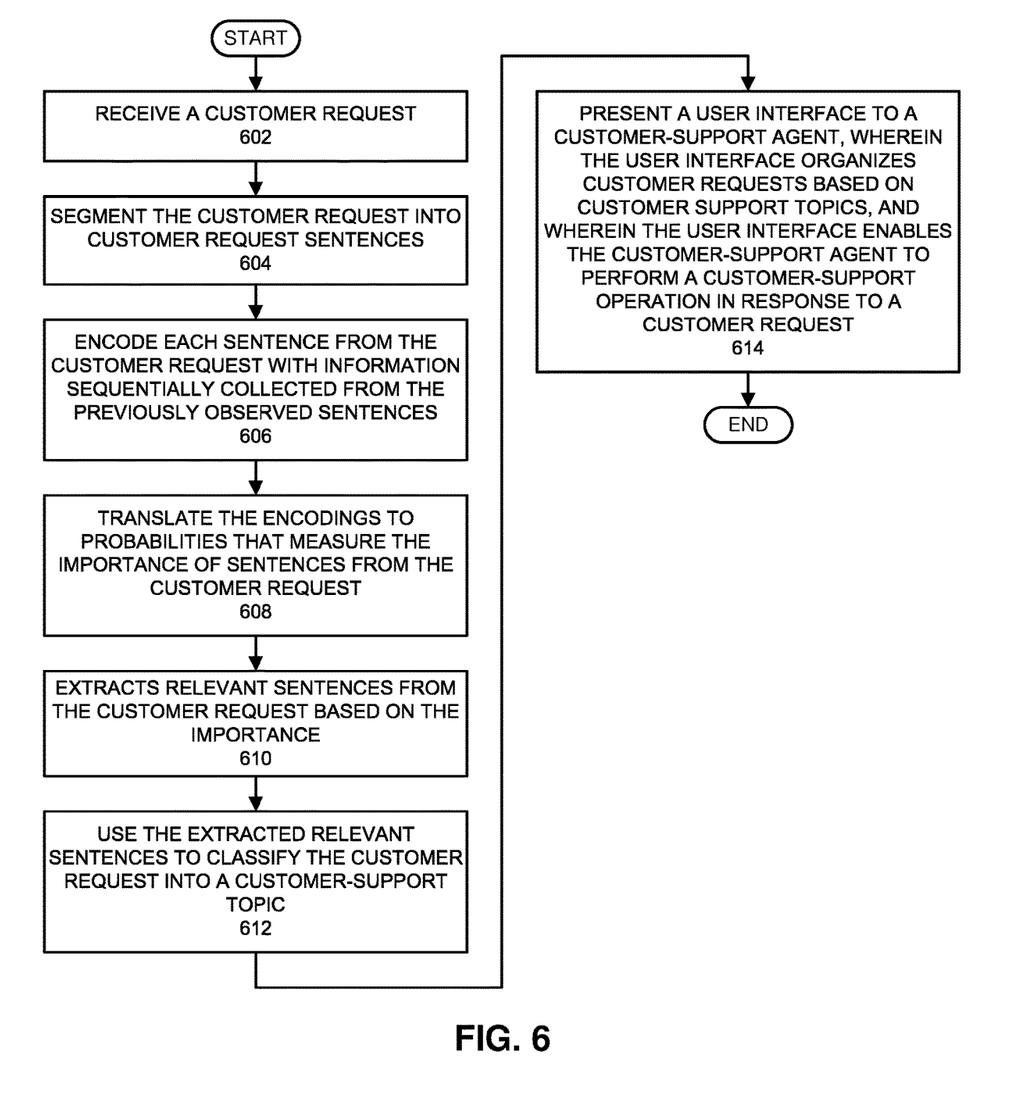
FIG. 6 presents a flow chart illustrating a process for classifying a customer request in accordance with the disclosed embodiments.

FIG. 6 presents a flow chart illustrating a process for classifying a customer request in accordance with the disclosed embodiments. During operation, the system receiving a customer request (step 602). Next, the system segments the customer request into customer request sentences (step 604). The system then encodes each sentence from the customer request with information sequentially collected from the previously observed sentences (step 606). Next, the system translates the encodings to probabilities that measure the importance of sentences from the customer request (step 608). Then, the system extracts relevant sentences from the customer request based on the importance (step 610). The system then uses the extracted relevant sentences to classify the customer request into a customer-support topic (step 612). Finally, the system presents a user interface to a customer-support agent, wherein the user interface organizes customer requests based on customer-support topics, and wherein the user interface enables the customer-support agent to perform a customer-support operation in response to a customer request (step 614).

Figure 7:
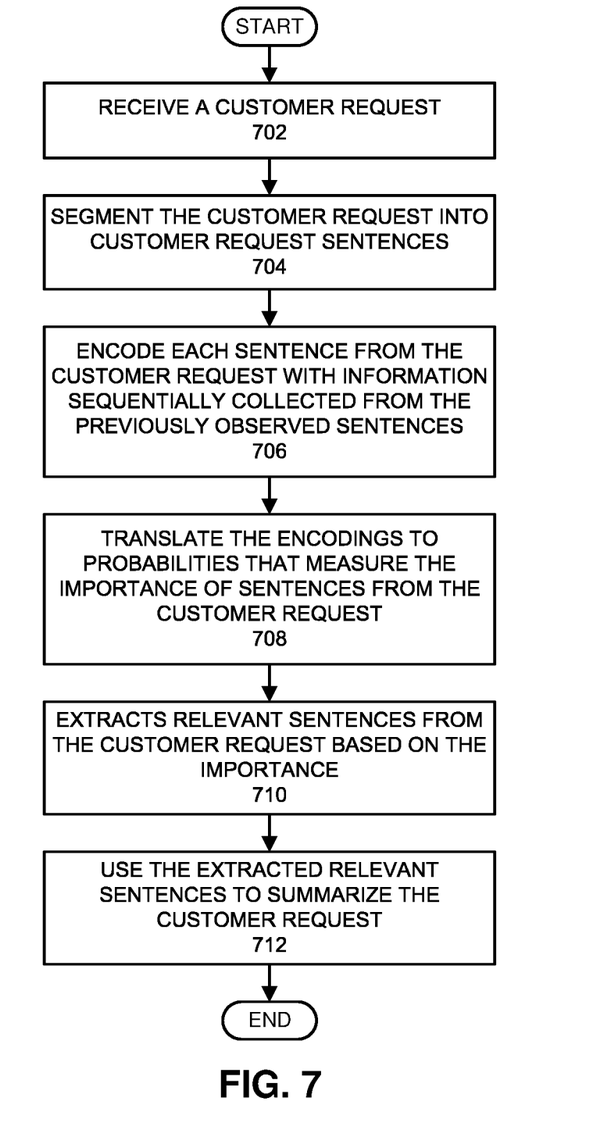
FIG. 7 presents a flow chart illustrating a process for summarizing a customer request in accordance with the disclosed embodiments.

FIG. 7 presents a flow chart illustrating a process for summarizing a customer request in accordance with the disclosed embodiments. During operation, the system receives a customer request (step 702). Next, the system segments the customer request into customer request sentences (step 704). The system then encodes each sentence from the customer request with information sequentially collected from the previously observed sentences (step 706). Next, the system translates the encodings to probabilities that measure the importance of sentences from the customer request (step 708). Then, the system extracts relevant sentences from the customer request based on the importance (step 710). Finally, the system uses the extracted relevant sentences to summarize the customer request (step 712).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for automatically resolving a customer request, comprising:
   receiving a customer request;
   segmenting the customer request into customer request sentences;
   encoding each customer request sentence with information sequentially collected from previously observed sentences;
   using the encodings to determine probabilities that measure importance of the customer request sentences;
   extracting relevant sentences from the customer request based on the probabilities;

forming an extracted-sentence customer request embedding from embeddings for the extracted relevant customer request sentences;

using the extracted-sentence customer request embedding to select an agent response from a set of possible agent responses based on comparisons between the extracted-sentence customer request embedding and embeddings for the set of possible agent responses;

presenting the selected agent response to the customer to facilitate resolving the customer request;

receiving feedback indicating whether or not the selected agent response was helpful in resolving the customer request; and using a contrastive loss, which includes components from both positive and negative predictions, to guide a training process for a model that is used to select the relevant sentences from a customer request.

2. The method of claim 1, wherein:

the method uses a combination of a recurrent neural network (RNN), a feed-forward network, and Sparsemax while determining the probabilities for the customer request sentences; and the method uses a convolutional neural network (CNN) while forming the extracted-sentence customer request embedding from the embeddings for the extracted relevant customer request.

3. The method of claim 1, wherein the method further comprises forming an embedding for a new agent response by:

receiving the new agent response, which is responsive to a customer request;

segmenting the new agent response into new agent response sentences;

embedding the new agent response sentences to produce corresponding new agent response sentence embeddings; and forming a new agent response embedding from the new agent response sentence embeddings.

4. The method of claim 1, wherein the method further comprises training a model, which is used to select agent responses, based on a training data set comprising a set of customer requests and a set of associated agent responses.

5. The method of claim 1, wherein the agent response comprises one or more of:

a responsive textual communication drafted by an agent; and a responsive article.

6. The method of claim 1, wherein the customer request includes a question from the customer about a product or a service used by the customer.

7. The method of claim 1, wherein the customer request comprises a ticket associated with a customer issue in a help center ticketing system.

8. A non-transitory computer-readable storage medium storing instructions that when executed by a computer cause the computer to perform a method for automatically resolving a customer request, the method comprising:

receiving a customer request;

segmenting the customer request into customer request sentences;

encoding each customer request sentence with information sequentially collected from previously observed sentences;

using the encodings to determine probabilities that measure importance of the customer request sentences;

extracting relevant sentences from the customer request based on the probabilities;

forming an extracted-sentence customer request embedding from embeddings for the extracted relevant sentences;

using the extracted-sentence customer request embedding to select an agent response from a set of possible agent responses based on comparisons between the extracted-sentence customer request embedding and embeddings for the set of possible agent responses;

presenting the selected agent response to the customer to facilitate resolving the customer request;

receiving feedback indicating whether or not the selected agent response was helpful in resolving the customer request; and using a contrastive loss, which includes components from both positive and negative predictions, to guide a training process for a model that is used to select the relevant sentences from a customer request.

9. The non-transitory computer-readable storage medium of claim 8, wherein:

the method uses a combination of a recurrent neural network (RNN), a feed-forward network, and Sparsemax while determining the probabilities for the customer request sentences; and the method uses a convolutional neural network (CNN) while forming the extracted-sentence customer request embedding from the embeddings for the extracted relevant customer request sentences.

10. The non-transitory computer-readable storage medium of claim 8, wherein the method further comprises forming an embedding for a new agent response by:

receiving the new agent response, which is responsive to a customer request;

segmenting the new agent response into new agent response sentences;

embedding the new agent response sentences to produce corresponding new agent response sentence embeddings; and forming a new agent response embedding from the new agent response sentence embeddings.

11. The non-transitory computer-readable storage medium of claim 8, wherein the method further comprises training a model, which is used to select agent responses, based on a training data set comprising a set of customer requests and a set of associated agent responses.

12. The non-transitory computer-readable storage medium of claim 8, wherein the method further comprises:

receiving feedback indicating whether or not the selected agent response was helpful in resolving the customer request; and using a contrastive loss, which includes components from both positive and negative predictions, to guide a training process for a model that is used to select the relevant sentences from a customer request.

13. The non-transitory computer-readable storage medium of claim 8, wherein the agent response comprises one or more of:

a responsive textual communication drafted by an agent; and a responsive article.

14. The non-transitory computer-readable storage medium of claim 8, wherein the customer request includes a question from the customer about a product or a service used by the customer.

15. The non-transitory computer-readable storage medium of claim 8, wherein the customer request comprises a ticket associated with a customer issue in a help center ticketing system.

16. A method for classifying a customer request, comprising:
receiving a customer request;
segmenting the customer request into customer request sentences;
encoding each customer request sentence with information sequentially collected from previously observed sentences;
using the encodings to determine probabilities that measure importance of the customer request sentences;
extracting relevant sentences from the customer request based on the probabilities; and
using the extracted relevant sentences to classify the customer request into a customer-support topic.

17. The method of claim 16, further comprising presenting a user interface to a customer-support agent, wherein the user interface organizes customer requests based on customer-support topics, and wherein the user interface enables the customer-support agent to perform a customer-support operation in response to a customer request.

18. The method of claim 17, wherein the customer-support operation includes one or more of the following:
suggesting an agent's answer or a helpful article to the customer;
creating, editing or deleting help center answers or articles; and
configuring a chatbot to facilitate resolving the customer request.

19. A method for summarizing a customer request, comprising:
receiving a customer request;
segmenting the customer request into customer request sentences;
encoding each customer request sentence with information sequentially collected from previously observed sentences;
using the encodings to determine probabilities that measure importance of the customer request sentences;
extracting relevant sentences from the customer request based on the probabilities; and
using the extracted relevant sentences to summarize the customer request.

* * * * *